United States Patent [19]

Adamson et al.

[11] Patent Number: 5,437,747
[45] Date of Patent: Aug. 1, 1995

[54] METHOD OF FABRICATING ZIRCALOY TUBING HAVING HIGH RESISTANCE TO CRACK PROPAGATION

[75] Inventors: Ronald B. Adamson, Fremont; Gerald A. Potts, San Jose, both of Calif.

[73] Assignee: General Electric Company, San Jose, Calif.

[21] Appl. No.: 52,791

[22] Filed: Apr. 23, 1993

[51] Int. Cl.⁶ .............................................. C22F 1/18
[52] U.S. Cl. .................................. 148/519; 148/520; 148/672
[58] Field of Search ............... 148/421, 672, 570, 519, 148/520; 420/422

[56] References Cited

U.S. PATENT DOCUMENTS

| | | | |
|---|---|---|---|
| 4,576,654 | 3/1986 | Eddens et al. | 148/519 |
| 4,671,826 | 6/1987 | Prizzi | 148/672 |
| 4,678,521 | 7/1987 | Yoshida et al. | 148/421 |
| 4,717,428 | 1/1988 | Comestock et al. | 148/672 |
| 4,718,949 | 1/1988 | Takase et al. | 148/421 |
| 4,908,071 | 3/1990 | Anderson et al. | 148/672 |
| 5,076,488 | 12/1991 | Graham | 148/519 |
| 5,242,515 | 9/1993 | Worcester et al. | 420/422 |
| 5,296,058 | 9/1993 | Steinberg | 148/672 |

FOREIGN PATENT DOCUMENTS 0425465 10/1990 European Pat. Off. .
WO92/08818 5/1992 WIPO .

*Primary Examiner*—George Wyszomierski
*Attorney, Agent, or Firm*—James E. McGinness; Jeffrey K. Weaver

[57] ABSTRACT

In a zirconium-alloy fuel element cladding, a method for generating regions of coarse and fine intermetallic precipitates across the cladding wall is provided. The method includes steps of specific heat treatments and anneals that coarsen precipitates in the bulk of the cladding. The method also includes at least one step in which an outer region (exterior) of the cladding is heated to the beta or alpha plus beta phase, while an inner region (interior) is maintained at a temperature at which little or no metallurgical change occurs. This method produces a composite cladding in which the outer region comprises fine precipitates and the inner region comprises coarse precipitates.

48 Claims, 3 Drawing Sheets

FABRICATION PROCESS

| PROCESS STEP | CURRENT #1 | CURRENT #2 | CURRENT #3 | NEW #1 | NEW #2 | NEW #3 | NEW #4 | NEW #5 |
|---|---|---|---|---|---|---|---|---|
| BETA QUENCH | 6" size fast quench | 6" size fast quench | 6" size fast quench | 6" size fast quench | 6" size fast quench | >6" size slow quench | 6" size fast quench | >6" size slow quench |
| EXTRUDE | ~570°C | ~570°C | ~570°C | ~570°C+ | 570°C+ | >570°C Rock and Anneal 700°C/8 hr. | ~570°C+ | >570°C Rock and Anneal 700°C/8 hr. |
| TUBESHELL | 927°C/fast quench outer 30% of wall | Anneal 650°C 2 hr. rock & anneal | 570°C rock & anneal 620°C 2 hrs. | Anneal 700°C 8 hr. | Anneal 700°C 8 hr. 927°C / quench outer 15% of wall | - | Anneal 700°C 8 hr. | - |
| 1ST PASS 70% CWORK | Yes | Yes | Yes | Yes | Yes | Yes | Yes | Yes |
| ANNEAL | 593°C 2 hr. | 621°C 2 hr. | 621°C 2 hr. | 650°C 4 hr. | 621°C 2 hr. | 650°C 4 hr. | 650°C 4 hr. | 650°C 4 hr. |
| HEAT TREAT | - | 1045°C fast quench outer 30% of wall | 1045°C fast quench outer 30% of wall | 1045°C fast quench outer 15% of wall | - | 1045°C fast quench outer 15% of wall | 927°C fast quench outer 15% of wall | 927°C fast quench outer 15% of wall |
| 2ND PASS 70% CW | Yes | Yes | Yes | Yes | Yes | Yes | Yes | Yes |
| ANNEAL | 593°C 2 hr. | 577°C 2 hr. | 577°C 2 hr. | 650°C 2 hr. | 621°C 2 hr. | 650°C 2 hr. | 621°C 2 hr. | 621°C 2 hr. |
| 3RD PASS 70% CW | Yes | Yes | Yes | Yes | Yes | Yes | Yes | Yes |
| RECRYSTAL- IZATION ANNEAL | 577°C 2 hr. | 577°C 2 hr. | 577°C 2 hr. | 577°C 2 hr. | 577°C 2 hr. | 577°C 2 hr. | 577°C 2 hr. | 577°C. 2 hr. |

FIG. 4

FABRICATION PROCESS

| PROCESS STEP | CURRENT #1 | CURRENT #2 | CURRENT #3 | NEW #1 | NEW #2 | NEW #3 | NEW #4 | NEW #5 |
|---|---|---|---|---|---|---|---|---|
| BETA QUENCH | 6" size fast quench | 6" size fast quench | 6" size fast quench | 6" size fast quench | 6" size fast quench | >6" size slow quench | 6" size fast quench | >6" size slow quench |
| EXTRUDE | ~570°C | ~570°C | ~570°C | ~570°C+ | 570°C+ | >570°C Rock and Anneal 700°C/8 hr. | ~570°C+ | >570°C Rock and Anneal 700°C/8 hr. |
| TUBESHELL | 927°C/fast quench outer 30% of wall | Anneal 650°C 2 hr. rock & anneal | 570°C rock & anneal 620°C 2 hrs. | Anneal 700°C 8 hr. | Anneal 700°C 8 hr. / 927°C / quench outer 15% of wall | - | Anneal 700°C 8 hr. | - |
| 1ST PASS 70% CWORK | Yes | Yes | Yes | Yes | Yes | Yes | Yes | Yes |
| ANNEAL | 593°C 2 hr. | 621°C 2 hr. | 621°C 2 hr. | 650°C 4 hr. | 621°C 2 hr. | 650°C 4 hr. | 650°C 4 hr. | 650°C 4 hr. |
| HEAT TREAT | - | 1045°C fast quench outer 30% of wall | 1045°C fast quench outer 30% of wall | 1045°C fast quench outer 15% of wall | - | 1045°C fast quench outer 15% of wall | 927°C fast quench outer 15% of wall | 927°C fast quench outer 15% of wall |
| 2ND PASS 70% CW | Yes | Yes | Yes | Yes | Yes | Yes | Yes | Yes |
| ANNEAL | 593°C 2 hr. | 577°C 2 hr. | 577°C 2 hr. | 650°C 2 hr. | 621°C 2 hr. | 650°C 2 hr. | 621°C 2 hr. | 621°C 2 hr. |
| 3RD PASS 70% CW | Yes | Yes | Yes | Yes | Yes | Yes | Yes | Yes |
| RECRYSTALIZATION ANNEAL | 577°C 2 hr. | 577°C 2 hr. | 577°C 2 hr. | 577°C 2 hr. | 577°C 2 hr. | 577°C 2 hr. | 577°C 2 hr. | 577°C. 2 hr. |

METHOD OF FABRICATING ZIRCALOY TUBING HAVING HIGH RESISTANCE TO CRACK PROPAGATION

This invention relates to methods of fabricating zircaloy cladding for use in nuclear fuel elements. More particularly, the invention relates to methods of fabricating cladding having precipitates that vary in coarseness and density across the cladding wall, to resist crack propagation in an inner region and fine precipitates in an outer region to resist corrosion.

BACKGROUND OF THE INVENTION

Nuclear reactors have their fuel contained in sealed cladding for the isolation of the nuclear fuel from the moderator/coolant system. The term cladding, as used herein, refers to a zirconium based alloy tube composed of at least one metal in addition to the zirconium base. The term precipitates, as used herein, refers to added metals of the cladding and forming isolated structures in a matrix throughout the zirconium alloy. These precipitates may or may not constitute intermetallics. Typically, these precipitates are uniformly distributed in the matrix—although they vary in size. Further, so-called fine precipitates (below 0.1 microns), can either be in the matrix format or the so-called two dimensional format where the precipitates occupy sheet like layer near the outer surface of the zirconium alloy.

The cladding—nominally in the order of 0.030 inches thick—is formed in the shape of a tube with the nuclear fuel contained typically in pellet form therein. These pellets are stacked in contact with one another for almost the entire length of each cladding tube, which cladding tube is in the order of 160 inches in length. Typically, the cladding tube is provided with springs for centering the fuel pellets and so-called "getters" for absorbing fission gases. Thereafter, the internal portions of the fuel rod are pressurized with various gases for optimum dissipation of gases produced from the fission reaction, and sealed at both ends.

Zirconium and its alloys, under normal circumstances, are excellent nuclear fuel cladding since they have low neutron absorption cross sections and at temperatures below about 398° C. (at or below the core temperature of the operating reactor) are strong, ductile, extremely stable and nonreactive in the presence of demineralized water or steam. "Zircaloys" are a widely used family of corrosion-resistant zirconium alloy cladding materials. The Zircaloys are composed of 98–99% by weight zirconium, with the balance being tin, iron, chromium, and nickel. "Zircaloy-2" and "Zircaloy-4" are two widely-used zirconium-based alloys for cladding. (Zircaloy-4 omitting nickel).

Cladding corrosion is a potential problem both in boiling water reactors and pressurized water reactors. For example, in a PWR, water does not boil—although in modern designs minute boil can occur at the top of some fuel rods. The oxygen level is relatively suppressed, being about 20 ppb. Hydrogen is injected and resident in the water moderator at about 200 ppb and utilized to suppress oxygen levels. Water pressure is in the range of 2000 psi with temperature ranging from 300° C. to 380° C. dependant upon the operating state of the reactor.

Corrosion in PWR cladding is uniform and related to precipitate size in the Zircaloy cladding. Small precipitates have been found to actually accelerate the uniform corrosion phenomena. Consequently, relative large precipitate sizes are preferred in the PWR zirconium cladding.

In the radiation environment within the PWR, the precipitates dissolve and become smaller with exposure. To avoid accelerated uniform corrosion buildup, PWR cladding uniformly starts with large precipitate sizes—0.2 microns and above—to slow the formation of small size precipitates and the more rapid uniform corrosion that occurs with the small size precipitates.

In a BWR environment, water does boil. The oxygen level is relatively high, being about 200 ppb. Hydrogen may be injected for the stability of structural parts of the reactor, is effectively stripped off as a part of the boiling, and is resident in the water moderator in the range of 20 ppb. Water pressure is in the range of 1000 psi with temperature at 288° C. being essentially a function of pressure and for the most part constant all operating rates of the reactor.

Corrosion in BWR cladding occurs in nodular or pustule formats. Uniform corrosion is also present—but in the usual case not to a significant degree. Further, mineral and particle deposition occurs on the water exposed surface of the cladding. The combination of the corrosion and depositions can become fairly thick on the water exposed portions of the cladding.

Nodular or pustule corrosion is not inherently bad. However, where fuel in the reactor has longer life—such as time within the reactor exceeding 40 megawatt days per ton, nodular or pustule corrosion concentrates. Where such nodular or pustule corrosion becomes concentrated and acts in conjunction with other particles—such as copper ions—localized penetration of the cladding wall can occur.

Small precipitates have been found to actually suppress nodule and pustule formation. Consequently, it is desired to have small precipitates—below 0.1 microns—to inhibit formation of nodules or pustules. It is known in the prior art to externally treat the outer water exposed surface of cladding with heating from a coil to produce a fine precipitate exterior surface. See Eddens et al. U.S. Pat. No. 4,576,654.

In the radiation environment within the BWR, the precipitates dissolve and become smaller with radiation exposure. Nodular corrosion is inhibited by the small precipitates and by the alloying elements put in solution by the dissolution process.

Anneals of zirconium alloys have been used and can be summarized in terms of temperature ranges. Starting at low temperatures, anneals above 480° C. effect stress relief, usually after working of the metal to achieve around 70% reduction in area. Anneals at about 576° C. not only effect stress relief but also commence recrystallization of the metal. In such anneals, maximum ductility of the material is achieved. Finally, anneals substantially above 576° C. effect crystal growth—generally softening the metal.

In the prior art, the heat treatment for PWR cladding has included high temperature anneals with slow quenches (less than 5°/second) to preserve large precipitate sizes. Conversely, the heat treatment for BWR cladding has included low temperature anneals with fast quenches (greater than 5°/second) to produce small precipitate sizes.

The corrosion resistance of Zircaloy cladding has been improved by forming small, uniformly distributed precipitate particles in the Zircaloy metal matrix. Some portion of the iron, chrome, and nickel components in the Zircaloy matrix form insoluble crystalline precipitates having chemical compositions distinct from the matrix. The precipitates are generally represented by the chemical formulas $Zr(Fe,Cr)_2$ and $Zr_2(Fe,Ni)$. Typically the precipitates used in the more corrosion resistant alloys have an average diameter of less than about 0.1 microns.

Corrosion and cracking can both damage cladding, but they are fundamentally different phenomena. Cracking is a mechanical breaking or splitting of the cladding wall, while corrosion is an electrochemical conversion of the cladding metal into an oxide or other non-metallic compound. Cracks may be initiated by a variety of causes including mechanical stresses as well as corrosion. Once a crack is initiated, it may pose little problem, so long as it remains confined to a small area. However, if the crack propagates, the cladding can be breached and the fission material eventually contacts the coolant or moderator. Ultimately, this can lead to an expensive reactor outage.

The mechanical initiation of cracks can be attributed to various stresses in a conventional reactor. Cracks can start when debris such as wires or metallic shavings or particles find their way into reactor water that flows within the fuel bundles between the fuel rods. The debris may lodge at a fuel rod spacer adjacent the cladding wall. As a result, the debris vibrates or frets against the cladding wall under the influence of the passing steam/water mixture. Such vibration continues until a crack begins.

Corrosion can be the source of initial crack propagation. Moreover, manufacturing defects can be the points of crack origin. Still further, crack propagation can start on the inside of the fuel rods in the corrosive high pressure environment present during in service reactor life.

Regarding cracking in the interior of the sealed cladding tube, brittle splitting of such cladding may occur due to the combined interactions between the nuclear fuel, the cladding, and the fission products produced during the nuclear reaction. It has been found that this undesirable performance is due to localized mechanical stresses on the fuel cladding resulting from differential expansion and friction between the fuel and the cladding. These localized stresses and strain in the presence of specific fission products, such as iodine and cadmium, are capable of producing cladding failures by phenomena known as stress corrosion cracking and liquid metal embrittlement. Other phenomena such as local hydriding of the cladding and the presence of oxygen, nitrogen, carbon monoxide, and carbon dioxide can assist cladding failure and lead to rod cracking.

Armijo et al U.S. Pat. Nos. 4,200,492 and 4,372,817 as well as Adamson U.S. Pat. No. 4,894,203 suggest solutions to preventing crack initiation by including a barrier on the inside of the cladding. Cladding containing introduce barrier are sometimes referred to as "composite" cladding or cladding having two distinct metallurgical layers.

Although it is highly desirable to prevent crack initiation, in the event a crack forms, its propagation is to be avoided.

There exists a need, especially for a BWR environment, for cladding which is resistant to axial crack propagation. There also exists a need for cladding which, in combination, is resistant to axial crack propagation, crack initiation and corrosion.

SUMMARY OF THE INVENTION

The present invention is directed to processes for generating coarse precipitates in an inner region (interior) and fine precipitates in the outer region (exterior) of a zirconium alloy tube wall. The inner region will have a low precipitate density and the outer region will have a high precipitate density. The methods of this invention include specific high temperature anneals that produce "coarsened precipitates" in the inner region of the tubing. The methods also include at least one heat treatment in which an outer region of the tubing is heated to the alpha plus beta phase or the beta phase and then rapidly quenched, while an inner region is maintained at a temperature at which little or no metallurgical change occurs. Resistance to damage caused by the pellet-cladding-interaction can also be achieved by application of a zirconium or zirconium-alloy liner on the tubing inside surface. The present methods produce a tubing which is resistant to propagation of cracks (especially in the axial direction of a tube) and at the same time is resistant to nodular corrosion. Such tube characteristics are believed to have the most utility in a BWR environment, but may also be desirable in a PWR or other reactor type environment.

Further details of the invention and its utility are provided in the following discussion and associated drawings.

BRIEF DESCRIPTION OF THE DRAWINGS

FIG. 4 is a table comparing three known processes for preparing zirconium alloy tubing with five processes according to the present invention.

DESCRIPTION OF THE SPECIFIC EMBODIMENTS

I. GENERAL

As used herein, the phrase "alpha crystalline structure" or "alpha phase" means the close-packed hexagonal crystal lattice structure of zirconium and zirconium-containing alloys that is stable at lower temperatures. The temperature range in which the alpha phase is stable is referred to as the alpha range. For Zircaloy-2, the pure alpha phase exists at temperatures lower than about 820° C.

As used herein, the term "beta crystalline structure" or "beta phase" means the body-centered cubic crystal lattice structure of zirconium and zirconium-containing alloys that is stable at higher temperatures. The temperature range in which the beta phase is stable is referred to as the beta range. For Zircaloy-2, the pure beta phase exists at temperatures above about 960° C.

Figure 1:
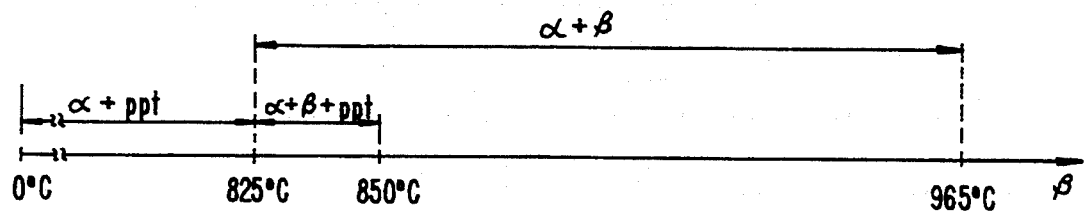
FIG. 1 is a phase chart for a typical zirconium containing alloy.

As used herein, the term "alpha plus beta crystalline structures" or "alpha plus beta phases" refers to a mixture of the alpha and beta phases that exists at some temperatures in some zirconium alloys. In pure zirconium, the alpha crystalline structure is stable up to about 860° C. At about this temperature a phase change occurs to form a beta crystalline structure which is stable at temperatures above about 860° C. Zirconium alloys, in contrast, have a range of temperatures over which the alpha to beta phase change occurs. In this range, a mixture of alpha and beta crystalline structure is stable. The specific temperature range in which the mixture is stable depends on the specific alloy. Zircaloy-2, for example, exhibits a stable mixture of alpha plus beta crystalline structures from about 825° C. to about 965° C. Below about 850° C., intermetallic precipitates form. FIG. 1 shows the various phase regions for Zircaloy-2.

As used herein, the term "section" refers to a piece of metal having various uses and shapes. The term "tubing" refers to a metal tube having various uses, and the term "fuel rod container" or just "container" refers to tubing used in fuel rods to enclose fuel pellets. Sometimes the fuel rod container is referred to as "cladding" in the art.

The precipitate size within a Zircaloy or other alloy can be controlled by various well-known manufacturing processes. Initially, the precipitate size is governed essentially by the quenching rate from the beta phase. Rapid quenching rates (e.g. rates faster than about 50° C. per second) give smaller precipitates, while more slow quenching rates give larger precipitates. Subsequent heat treatments and anneals can coarsen the precipitates. Generally, and in relative terms, higher temperatures and longer times for anneals promotes coarsening of the precipitate microstructure, while lower temperatures and shorter times for anneals preserves a fine precipitate microstructure. A fine dense microstructure can be produced by high temperature heat treatments to the beta or alpha plus beta regions followed by rapid quenching.

Figure 2:
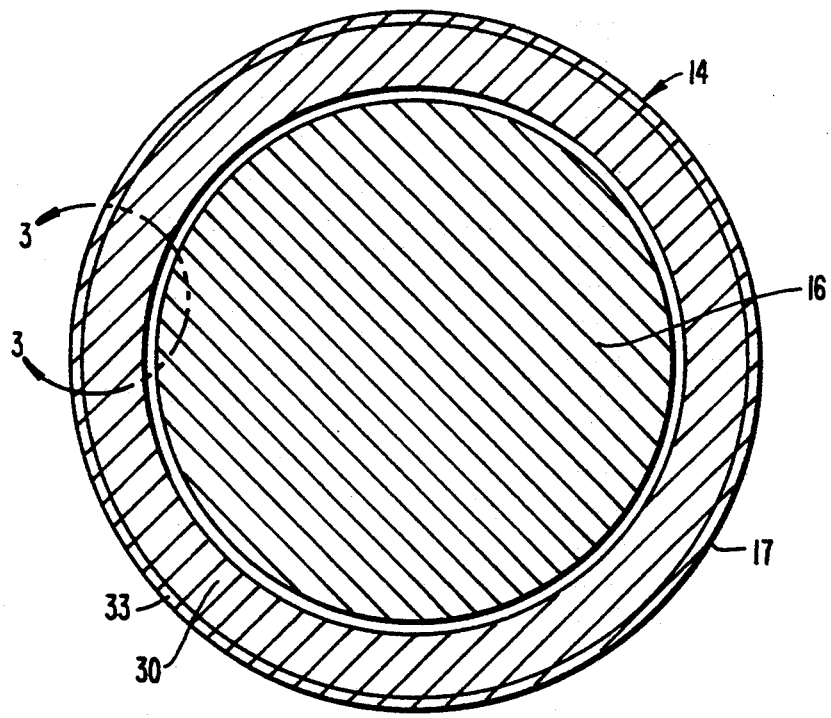
FIG. 2 is a cross-sectional view of a preferred fuel rod of the present invention.

Referring to FIG. 2, a fuel element 14 (commonly referred to as a fuel rod) includes a fuel material core 16 and a surrounding container 17 prepared according to a method of this invention. The fuel element 14 is designed to provide excellent thermal contact between the fuel rod container 17 and the fuel material core 16, a minimum of parasitic neutron absorption, and resistance to bowing and vibration which is occasionally caused by flow of coolant at high velocity. The fuel material core is typically composed of a plurality of fuel pellets of fissionable and/or fertile material. The fuel core may have various shapes, such as cylindrical pellets, spheres, or small particles. Various nuclear fuels may be used, including uranium compounds, thorium compounds and mixtures thereof. A preferred fuel is uranium dioxide or a mixture comprising uranium dioxide and plutonium dioxide.

The fuel rod container 17 prepared according to this invention has at least two distinct metallurgical regions: an inner region (interior) 30 containing coarse precipitates and an outer region (exterior) 33 containing fine precipitates. The transition region between the inner and outer regions is sometimes referred to as a metallurgical gradient. In general, it will be a relatively sharp boundary. As used herein, the transition region is considered to be part of the outer region. Typically, it will occupy no more than about 25% of the outer region, but this is by no means a required value. In some cases, the transition region will occupy a much as 5 to 10% of the entire tube wall.

Figure 3:
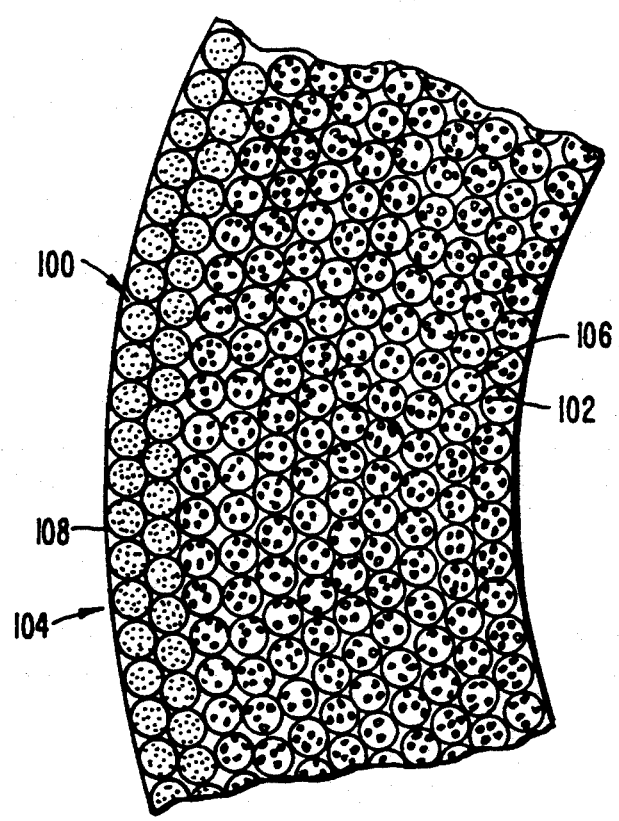
FIG. 3 is a schematic diagram showing regions of fine and coarse precipitates in tubing produced according to the present invention.

FIG. 3 depicts the microstructure of a tube wall 104 produced according to the methods of this invention. As shown in the outer region of the tube wall, the zirconium alloy exists as grains 100. In the inner region of the tube wall, the alloy exists as grains 106. Generally, the grains in the inner and outer regions will have roughly the same size. The microstructure of the grains, however, is different in the two regions. As shown, the outer region grains contain dense collections of fine precipitates 108, while the inner region grains contain less dense collections of coarse precipitates 102. In some embodiments, the inner surface of tube wall 104 will contain a zirconium liner or barrier (not shown).

Both the inner and outer regions of container 17 are preferably comprised of a zirconium alloy such as Zircaloy-2 or Zircaloy-4. Zircaloy-2 has on a weight basis about 1.5 percent tin; 0.12 percent iron; 0.09 percent chromium and 0.05 percent nickel. Zircaloy-4 has essentially no nickel and about 0.2% iron but is otherwise substantially similar to Zircaloy-2. "Zirlo"—a zirconium based alloy containing about 1% tin, about 1% niobium, and less than about 0.2% iron—is another alloy that may be used with this invention. Still other alloys that may be used with present invention include at least about 98% zirconium, between about 0.06 and 0.25% iron, between about 0.03 and 0.1% nickel, and between about 0.8 and 1.7% tin (all percents by weight). Other additives may include niobium, bismuth, molybdenum, as well as various other elements used in the art. Most generally, any zirconium alloy that forms intermetallics may be employed.

Preferably, the fine precipitates employed in this invention have an average diameter of between about 0.01 and 0.15 microns, and more preferably between about 0.02 and 0.06 microns. Most preferably, the average diameter of the fine precipitates is about 0.04 micron. Preferably, the coarse precipitates have an average diameter of between about 0.15 and 2.0 microns, and more preferably between about 0.2 and 1.0 microns. The above precipitate diameters are easily determined by standard transmission electron microscopy (TEM and STEM) known in the art.

The zircaloy regions containing fine precipitates are more corrosion resistant than regions containing coarse precipitates. Regions containing coarse precipitates are believed to impart resistance to crack propagation. Although corrosion is normally most pronounced at the cladding surfaces, crack initiation and crack propagation occur throughout the entire cladding wall. Thus, the methods of this invention will produce tubing in which only the outer surface contains fine precipitates, while more coarse precipitates are present on the inner surface and throughout the bulk of the cladding wall.

In preferred embodiments, the outer region containing the "fine" precipitate will span between about 5 and 20% of the wall thickness, while the inner or bulk region containing the coarse precipitate will span between about 80 and 95% of the wall thickness. In more preferred embodiments, the outer region will span between about 5 and 15%, and most preferably, about 10% of the wall thickness. Thus, in typical tubing having a wall thickness of 30 mils, the outer region will preferably occupy about 3 mils.

The methods of this invention have as their goal the formation of tubing having the above properties. Generally the process is started with a Zircaloy-2 thick-walled billet that has been rapidly quenched from the beta phase. In some embodiments, however, a slower quench may be used. As used herein, a rapid quench refers to a quench rate of faster than about 5° C. per second. More preferably, the quench rate will be faster than about 50° C. per second. Rapid quench rates generally will produce tubes having fine precipitates dispersed throughout. Slower quench rates generally will produce coarser precipitates. After the beta quench, an extrusion step and possibly some cold working steps designed for dimensional stability are employed. Various steps are then performed to create or preserve an outer region having fine precipitates and inner region having coarse precipitates. In addition, multiple pass cold working are performed to impart the desired dimensions to the tube. After each cold work step, the tube is annealed to relieve stress and regain ductility. Preferably, the cold work passes are each conducted to about 70% although this is not critical to the invention. The percent value of cold work is roughly analogous to the percent reduction of wall thickness during the process.

To create or preserve coarse precipitates in the inner region of the tube, at least one high temperature anneal typically is performed. As used herein, a high temperature anneal refers to a process conducted at between about 650° and 750° C. for between about 1 and 100 hours; more preferably between about 700° C. and 750° C. for between about 1 and 10 hours; and most preferably at about 700° C. for about 8 hours. In addition to the high temperature anneal, the anneals following cold working should be conducted at relatively high temperatures and for relatively long times to promote formation of coarse precipitates. Preferably, the anneals following cold work should be conducted at temperatures between about 576° C. to 650° C., for between about 1 and 10 hours and more preferably between about 620° C. and 650° C. for about two to four hours. It will be recognized by those of skill in the art that the temperatures and times of the heat treatments and anneals may be varied somewhat from the above values. Generally, the coarse precipitates preferred in this invention will be produced higher temperatures and longer times. In contrast, treatments at lower temperatures and shorter times tend to preserve the fine precipitate microstructure.

The anneal temperature after cold working will affect the grain structure as well as the precipitate structure. For 70% cold work, anneals at temperatures between about 490° C. and 577° C. will relieve stress, and therefore are referred to as stress relief anneals. At higher temperatures (i.e. above about 577° C.), recrystallization will occur. This not only relieves the stress imparted by cold work, but reorients the grains. If a somewhat higher temperature anneal is used (e.g. above about 650° C.), grain growth will occur. These temperatures are not fixed but are a function of the amount of cold work. More cold work imparts a larger driving force for stress relief, recrystallization, etc. Thus, as more cold work is performed, the temperature of stress relief, recrystallization, etc. decreases.

The fine precipitate structure can be introduced by heating to a high temperature and then rapidly quenching a section of the tube. One way to accomplish this is by selectively heating and rapidly quenching the outer region to the alpha plus beta region or the pure beta region while maintaining the inner region at a lower temperature. This creates a metallurgical gradient in which the outer region contains fine precipitates, while the inner region retains coarse precipitates. This heat treatment step can be accomplished by various methods including an induction coil heater as described below.

It should be understood that various methods may be employed to produce tubing having the desired microstructure. If a rapid beta quench is employed early in the process, subsequent steps will be necessary to coarsen the precipitates. If on the other hand, a slow beta quench is employed, subsequent steps will be chosen to maintain or further coarsen the precipitates.

For ease in understanding the differences between some known processes and the processes of this invention—as well as understanding how the process steps affect the microstructure of the final tubing—three known processes will be described, and then five exemplary processes according to the present invention will be described. It is to be understood that the described embodiments of this invention are not intended to be limiting, as various alternative processes will produce the desired microstructure. The temperatures and times recited in these examples could be adjusted somewhat without substantially changing the microstructure as is known in the art. In addition, the examples are provided for Zircaloy-2. When other alloys are used, the conditions will be different.

II. EXEMPLARY PROCESSES

The three known processes described below will be referred to throughout as "process 1," "process 2," and "process 3." The five embodiments of the present invention described below will be referred to throughout as "new processes" 1–5. A tabular summary of the steps employed in the individual processes is provided for convenient comparison in FIG. 4.

KNOWN PROCESSES

Process 1

The process is started with a billet of approximately six inches in diameter and two feet in length. By the end of the processes described herein, the billet will be converted to about 400 feet of tubing having about a one-half inch outer diameter.

A rapid beta quench is done on the billet. The rate of the beta quench depends, in part, on the thickness of the billet; thinner billet are quenched faster. Generally, the beta quench involves heating the billet into beta phase, above about 1000° C., and then rapidly cooling from 1000° C. to about 700° C. by immersion in a tank of water. The quench rate is important between 1000° C. and 700° C.; after 700° C. is reached, however, the rate of cooling can be increased or decreased as desired.

Next, the tube is extruded with the tube temperature being at about 570° C. to a diameter of about 3 inches. Extrusion is accomplished by putting the tube through a set of tapered dies under high pressure. Suitable extruders are available from Mannessmann Demang, Coreobolis, Pa. The extruded product is referred to as a "tubeshell" which is available in specified dimensions from various vendors such as Teledyne Wahchang (Albany, Oreg. USA), Western Zirconium (A Westinghouse company of Ogden, Utah), and Cezus (France).

The tubeshell is heat treated at about 927° C. (in the alpha plus beta crystalline region) on the outer 30% of the wall. This is accomplished by heating the tubeshell with a high-energy or frequency (from an induction coil) which penetrates about 33% of the wall. During the induction heating water flows through the tube center. This serves two purposes: first it maintains the interior of the tube at a lower temperature while the outer region is heated, and second it very rapidly quenches the entire tube when the heating energy is removed. It is important to recognize that the inner portion of the tubeshell is not substantially heated. Further details of the induction heating process are provided in Eddens U.S. Pat. No. 4,576,654 which is incorporated herein by reference for all purposes.

Regarding the cooling of the tube, any fluid which is generally inert with respect to the zirconium alloy or barrier material can be used. For example, a gas coolant, water, or even steam can be used in such a process.

At this point, the first of three cold-work reductions is performed. The heat treated tubeshell is passed through a pilger mill. It will be understood by the reader that pilger mills are generally available, albeit fairly complicated, pieces of equipment. During cold working with a pilger mill, a shaped die is rolled on the outside of the tube while a hard tapered mandrel supports the inside of the tube. In this manner, the wall thickness and diameter of the tube are simultaneously reduced.

Typically about 70% cold work is performed. This means that percent value is roughly analogous to the percent reduction of the wall thickness. If the tube is given any more cold work without stress relief, it may likely crack during manufacture.

To relieve the stress caused by cold working, the tube is annealed at about 593° C. for two hours in a large vacuum annealing furnace such as is available from Centorr Vacuum Industries, located in Nashua, N.H. Next, a second pass cold work is performed (again to about 70%) with a pilger mill. To remove the stress induced by this second pass cold work step, another anneal (again at 593° C. for about 2 hours) is performed. Finally, the third pass cold work is performed as before. This reduces the tube to its final size—about one-half inch outer diameter with a nominal wall thickness of roughly 30 mils.

This tube is cut up into lengths for fuel rods (i.e. about 14 feet long) and given a final anneal at 577° C. for about two hours. This is a "recrystallization anneal". Alternatively, the final anneal could be a stress release anneal conducted at any temperature between about 480° C. to 577° C. After the final anneal, the tube is ready for use in the reactor.

Process 2

The same rapid beta quench and tubeshell extrusion used in process 1 are used in this process. At the tubeshell stage, however, the heat treatment and fast quench are not performed. Instead, the tubeshell is annealed for about two hours at about 650° C. This softens the tube so that it is easier to work. Next, a first pass 70% cold work is employed as before. However, the subsequent anneal is conducted at a slightly higher temperature (621° C. for 2 hours).

At this point, a heat treatment is performed in which only the outer 30% of the tube is heated. This treatment is similar to the tubeshell heat treatment in the first process, but is conducted at a slightly higher temperature (1045° C. as opposed to 927° C.) and the tube is thinner by this stage.

Next, a second pass cold work is performed as in process 1, followed by an anneal at 577° C. (a slightly lower temperature than in the first process) for two hours. Finally, a third pass cold work and recrystallization or stress release anneal are conducted as before using the same temperatures and times.

Process 3

This process is identical to process 2 except that an additional "rock" step is performed after the extrusion. Rock is a cold work step to about 50%—typically used for dimensional control.

Summary

The goal behind each of the above sequences of annealing, cold working and heat treating is to provide a very corrosion resistant tube. The microstructure is such that the Zircaloy tubing contains very fine precipitates. The outer regions have the smallest precipitate sizes. The small precipitate size is driven by the combination of a fast quench and a relatively low annealing temperature. Quenching sets the precipitate size, and low annealing and working temperatures allow the precipitates to remain small.

NEW PROCESSES

New Process 1

A fast quench and extrusion are performed under the same conditions as employed in processes 1 and 2. At this point, the tubeshell is identical to that produced in the above processes. If the tubeshell had been extruded at a higher temperature, a material having coarsened precipitates would have been produced.

The tubeshell is annealed at high temperature (about 700° C.) for about eight hours. This is a substantially higher temperature and longer time than employed in the current processes. This causes the precipitates to coarsen in the entire structure.

Next, a first pass cold work to 70% is performed as in the known processes. A first anneal after cold working is conducted at a relatively high temperature (650° C. for four hours). This further coarsens the precipitates and represents a second change from the known processes in the time and temperature of conditions.

At this point, a heat treatment is performed to regain the smaller precipitates on the outside of the tube. This treatment is performed at 1045° C. (the pure beta phase). The tube is translated through an induction coil (typically less than 12 inches long). The coil rapidly heats the tube to the desired temperature and as the tube emerges from the coil, the tube cools rapidly. This process is similar to the treatment of the tubeshell in known process 1, however, it is modified so that only the outer 15% (as opposed to 30%) of the tube is heated. The penetration of the induction coil energy can be tuned by adjusting the induction coil frequency, the induction coil energy, the speed at which the tube moves through the induction coil, and the water temperature (flow rate). One of skill in the art will appreciate how to adjust these conditions to achieve the type of heat treatment that will form small precipitates at the outer 15% of the tube. Further details can be found in Eddens U.S. Pat. No. 4,576,654. The resulting tube will have good nodular corrosion resistance while retaining coarse precipitates in the inner regions.

Next, a second pass cold work to 70% is performed as in the known processes. This is followed by annealing at 650° C. for 2 hours which still further coarsens the precipitates in the tube interior without substantially affecting the corrosion resistance. A third pass cold work and a recrystallization or stress release anneal are performed under the same conditions as the known processes.

Unlike the tubing produced by the above processes, the zircaloy tubing produced by new process 1 will contain fairly coarse precipitates in the inner region of the tube.

New Process 2

In this embodiment, the induction heat treatment is conducted at the tubeshell stage of the process. The tubeshell is prepared as in the previous process; the original billet is rapidly beta quenched and then extruded at about 570° C. Next, the tubeshell is annealed at a high temperature (about 700° C. for about eight hours) as before. Until this point, the process parallels the first new process. At this stage, however, about the outer 15% of the tubeshell is heat treated at 927° C. (within the alpha plus beta phase temperature regime) by induction heating. The tubeshell is then quenched to produce the desired fine precipitates on the outer region of the tubeshell.

At this point, the tubeshell is cold worked to 70% as in the above processes. A next anneal at 621° C. for two hours, a second pass cold work, and another anneal at a temperature of about 621° C. for two hours are performed. By heating to 621° C., some recrystallization is ensured and the precipitates are further coarsened. A third pass cold work and final recrystallization or stress release anneal (preferably at about 577° C.) are performed under the conditions used in each of the above processes. The tubing produced by new process 2 has essentially the same microstructure as obtained with new process 1.

It should be noted that new process 2 is superficially similar the first described known process. However, before the heat treatment, this process employs a high temperature anneal which was not used in known process 1. In addition, the anneals after the first and second cold work steps are conducted at a higher temperatures than those of known process 1. The additional high temperature anneal and the higher temperature post-cold work anneals coarsen the precipitates in the tubeshell. Further, new process 2 employs an induction heating step that heats only the outer 15% of the tubeshell, as opposed to heating the outer 30% as in process 1.

New Process 3

In this process, the tubeshell is initially processed to have coarser precipitates than the beta quenched tubeshell used in the above processes. This is accomplished by cooling a billet more slowly than in the above the beta quenches described above. Preferably, the cooling rate will be slower than about 5° C. per second. The tube will then be extruded at 570° C. or at a higher temperature to further coarsen the precipitates in the resulting tubeshell.

Additional steps that could be performed at this stage include (1) rock—about a 50% cold work (typically used for dimensional control)—and then (2) anneal at 700° C. for 8 hours. At this point, a first pass cold work to 70% is performed and all subsequent steps are identical to those employed in new process 1, subsequent to the high temperature anneal.

New Process 4

This process is identical with new process 1 in all regards except that the step of selectively heat treating the outer region of the tube is conducted at a different temperature. In new process 1, the outer region was heated to the beta region (1045° C.); in this process, the outer region is heated only to the alpha plus beta region. In a preferred embodiment, the outer region is heated to 927° C. By heating only to the alpha plus beta region rather than the beta region, less oxidation of the outer surface occurs during heating, lower internal stresses are induced during quenching, and less energy is required for the heating.

New Process 5

This process is identical to new process 3 in all regards except that the outer region of the tube is heated into the alpha plus beta region (rather than the beta phase) in the step of selectively heat treating. Preferably, the outer region is heated to 927° C. in this step.

Summary

Each of the new processes will produce tubes having similar microstructures. Each new process employs (1) a high temperature anneal, i.e., anneal at about 700° C. for about eight hours, (optional in new process 3), (2) one or more lower temperature anneals (above about 610° C.) after cold working, and (3) a beta or alpha plus beta heat treatment followed by a rapid quench in which about only the outer 15% of the tube is treated.

It will be recognized by those of skill in the art that various steps are performed in addition to those listed in the above known and new processes. For example, chemical etching is employed to remove defects (cracked layers) on the surface. Further, straightening of tubes is often performed with pieces of equipment designed for this purpose. In addition, various nondestructive tests such as corrosion tests and ultrasonic tests for crack imperfections in the surface are performed. This is not an exhaustive list, but merely serves to describe some steps which may be employed.

III. BARRIER LAYERS

In some preferred embodiments, barrier layers having low neutron absorption are located on the fuel rod container inner surfaces to resist degradation caused by interaction with the nuclear fuel. It is known that the fuel rod container can be split or otherwise degraded due to interactions between the nuclear fuel, the fuel rod container, and the fission products of the fuel. The barrier layer is typically a highly pure zirconium (such as crystal bar zirconium) or moderately pure zirconium (such as sponge zirconium) sheath metallurgically bonded to the inner surface of the tubing. See Armijo U.S. Pat. No. 4,200,492 and Coffin U.S. Pat. No. 4,372,817, Vannesjo U.S. Pat. No. 4,610,842, and Adamson U.S. Pat. No. 4,894,203, each of which is incorporated herein by reference for all purposes. Other dilute zirconium alloys such as zirconium:0.5% tin, zirconium:0.1% iron:0.4% chromium, zirconium:0.4% bismuth:0.2% niobium, etc. may also be used in the barrier layer. Generally, the barrier is provided as a sleeve that is bonded to the tubing during the extrusion process. The subsequent process steps may be performed as described above. A typical barrier layer (which will form a third component of the structures of this invention) will form about 1 to 30 percent (and more preferably about 5 to 15 percent) of the total tubing thickness.

IV. ACCUMULATED NORMALIZED ANNEALING TIME

Those of skill in the art will understand that various heat treatment and annealing steps may be conducted in various orders to produce the distribution of coarse precipitates desired in this invention. Generally, combinations of long times and high temperatures will give the desired coarse precipitates. The relation of time, temperature and precipitate size may be mathematically described by an Arrhenius expression to give a parameter known as the accumulated normalized annealing time discussed in F. Garzarolli, et al., "Progress in the Knowledge of Nodular Corrosion", *Zirconium in the Nuclear Industry*, ASTM STP939, pp. 417–430 (1987), which is incorporated herein by reference for all purposes. The normalized annealing time "A" is given by the formula $A = t \exp(-40,000/T)$, where t is the time in hours, and T is the temperature in Kelvin. In multi-step processes, such as those of the present invention, the normalized annealing time of each step after the beta quench can be conveniently summed to give the accumulated normalized annealing time, $\Sigma A_i = \Sigma t_i \exp(-40,000/T_i)$. To obtain sufficiently coarsened precipitates for purposes of the present invention, the accumulated normalized annealing time will preferably be greater than $10^{-17}$ hours and more preferably greater than $5 \times 10^{-17}$.

V. CONCLUSION

Although the foregoing invention has been described in some detail for purposes of clarity of understanding, it will be apparent that certain changes and modifications may be practiced within the scope of the appended claims. For instance, the Zircaloy-2 described above is an example of an alloy that can advantageously be used in the present invention. Some other zirconium-based alloys as well as certain titanium-based alloys and other metal alloys having similar structures can in many instances also be used in the methods of this invention.

What is claimed is:

1. A method of processing a zirconium alloy tube, said method comprising the steps of:
    (a) performing a coarsening anneal at a temperature above 621° C. such that precipitates coarsen throughout the entire tube;
    (b) selectively heat treating an outer region of the tube by first heating the outer region to at least the alpha plus beta region while cooling an inner region of the tube and then rapidly quenching the outer region; and
    (c) performing one or more cold work steps, each said cold work step followed by an anneal step, the anneal step or steps being conducted at a temperature of greater than about 576° C.

2. The method of claim 1 wherein the zirconium alloy includes at least about 98% zirconium and, in addition, one or more elements selected from the group consisting of iron, nickel, chromium, tin, and niobium.

3. The method of claim 2 wherein the annealing step or steps following the cold work step or steps is conducted at between about 620° and 650° C.

4. The method of claim 1 wherein step (a) is conducted at between about 700° C. and 775° C. for between about 1 and 10 hours.

5. The method of claim 4 wherein step (a) is conducted at about 775° C. for about 4 hours.

6. The method of claim 1 wherein the step of selectively heat treating the outer region of the tube is conducted in an induction coil heater.

7. The method of claim 6 wherein said tube is cooled with an interior flowing fluid during said inductive heating step.

8. The method of claim 1 wherein the step of selectively heat treating the outer region of the tube heats only about the outer 15% of the tube.

9. The method of claim 1 wherein the step of selectively heat treating heats the outer region of the tube to the alpha plus beta region.

10. The method of claim 1 wherein the step of selectively heat treating heats the outer region of the tube to the beta region.

11. The method of claim 1 wherein the step of selectively heat treating the outer region of the tube includes cooling said tube from the interior with a fluid.

12. The method of claim 11 wherein the step of selectively heat treating the outer region of the tube includes cooling said tube from the interior with water.

13. The method of claim 12 wherein the step of selectively heat treating the outer region of the tube includes cooling said tube from the interior with steam.

14. The method of claim 1 further comprising performing a final cold work step followed by a stress relief anneal or a recrystallization anneal.

15. The method of claim 1 further comprising a step of beta surface quenching the tube.

16. A method of processing a zirconium alloy tube, said method comprising the steps of:
    (a) performing a coarsening anneal on the tube at between about 650° C. and 750° C. for between about 1 and 100 hours such that precipitates coarsen throughout the entire tube;
    (b) performing a first pass cold work step followed by annealing;
    (c) selectively heat treating an outer region of the tube by first heating the outer region to the beta phase while cooling an inner region of the tube and then rapidly quenching the outer region;
    (d) performing a second pass cold work step followed by annealing; and
    (e) performing a third pass cold work step followed by annealing.

17. The method of claim 16 wherein the step of selectively heat treating heats the outer region to a temperature of about 1045° C. and wherein the zirconium alloy includes at least about 98% zirconium and, in addition, one or more elements selected from the group consisting of iron, nickel, chromium, tin, and niobium.

18. The method of claim 17 wherein the annealing steps following the first and second cold work steps are conducted at a temperature of about 650° C. for between about two and four hours, and the annealing step following the third cold work step is conducted at about 577° C. for about two hours.

19. The method of claim 16 wherein said outer region of the tube comprises about the outer 15% of the tube.

20. The method of claim 16 further comprising a step of beta surface quenching the tube.

21. The method of claim 16 wherein said selective heat treating of an outer region includes the steps of inductively heating said outer region while cooling said tube with a fluid.

22. A method of processing a zirconium alloy tube, said method comprising the steps of:
    (a) performing a coarsening anneal on the tube at between about 650° C. and 750° C. for between about 1 and 100 hours such that precipitates coarsen throughout the entire tube;
    (b) selectively heat treating an outer region of the tube by first heating the outer region to the alpha plus beta region while cooling an inner region of the tube and then rapidly quenching the outer region;

(c) performing a first pass cold work step followed by annealing;

(d) performing a second pass cold work step followed by annealing; and (e) performing a third pass cold work step followed by annealing.

23. The method of claim 22 wherein the step of selectively heat treating heats the outer region to a temperature of about 927° C. and wherein the zirconium alloy includes at least about 98% zirconium and, in addition, one or more elements selected from the group consisting of iron, nickel, chromium, tin, and niobium.

24. The method of claim 23 wherein the annealing steps following the first and second cold work steps are conducted at a temperature of about 621° C. for between about two and four hours, and the annealing step following the third cold work step is conducted at about 577° C. for about two hours.

25. The method of claim 22 wherein said outer region of the tube comprises about the outer 15% of the tube.

26. The method of claim 22 further comprising a step of beta surface quenching the tube.

27. The method of claim 22 wherein said selective heat treating of an outer region includes the steps of inductively heating said outer region while cooling said tube with a fluid.

28. A method of processing a zirconium alloy billet, said method comprising the steps of:

(a) cooling the zirconium alloy billet from the beta phase at a rate slower than about 5° C. per second;

(b) extruding the billet to form a tube;

(c) conducting a rock cold work step;

(d) performing a coarsening anneal on the tube at between about 650° C. and 750° C. for between about 1 and 100 hours;

(e) performing a first pass cold work step followed by annealing;

(f) selectively heat treating an outer region of the tube by first heating the outer region to the beta phase while cooling an inner region of the tube and then rapidly quenching the outer region;

(g) performing a second pass cold work step followed by annealing; and (h) performing a third pass cold work step followed by annealing.

29. The method of claim 28 wherein the step of selectively heat treating heats the outer region of the tube to a temperature of about 1045° C. and wherein the zirconium alloy includes at least about 98% zirconium and, in addition, one or more elements selected from the group consisting of iron, nickel, chromium, tin, and niobium.

30. The method of claim 29 wherein the annealing steps following the first and second cold work steps are conducted at a temperature of about 650° C. for between about two and four hours, and the annealing step following the third cold work step is conducted at about 577° C. for about two hours.

31. The method of claim 28 wherein said outer region of the tube comprises about the outer 15% of the tube.

32. The method of claim 28 wherein said selective heat treating of an outer region includes the steps of inductively heating said outer region while cooling said tube with a fluid.

33. A method of processing a zirconium alloy tube, said method comprising the steps of:

(a) performing a coarsening anneal the tube at between about 650° and 750° C. for between about 1 and 100 hours such that precipitates coarsen throughout the entire tube;

(b) performing a first pass cold work step followed by annealing;

(c) selectively heat treating an outer region of the tube by first heating the outer region to the alpha plus beta region while cooling an inner region of the tube and then rapidly quenching the outer region;

(d) performing a second pass cold work step followed by annealing; and (e) performing a third pass cold work step followed by annealing.

34. The method of claim 33 wherein the step of selectively heat treating heats the outer region of the tube to a temperature of about 927° C. and wherein the zirconium alloy includes at least about 98% zirconium and, in addition, one or more elements selected from the group consisting of iron, nickel, chromium, tin, and niobium.

35. The method of claim 34 wherein the annealing steps following the first and second cold work steps are conducted at a temperature of about 650° C. for between about two and four hours, and the annealing step following the third cold work step is conducted at about 577° C. for about two hours.

36. The method of claim 33 wherein the outer region of the tube comprises about the outer 15% of the tube.

37. The method of claim 33 further comprising a step of beta surface quenching the tube.

38. The method of claim 33 wherein said selective heat treating of an outer region includes the steps of inductively heating said outer region while cooling said tube with a fluid.

39. A method of processing a zirconium alloy billet, said method comprising the steps of:

(a) cooling the zirconium alloy billet from the beta phase at a rate slower than about 5° C./second;

(b) extruding the billet to form a tube;

(c) conducting a rock cold work step;

(d) performing a coarsening anneal on the tube at between about 650° C. and 750° C. for between about 1 and 100 hours;

(e) performing a first pass cold work step followed by annealing;

(f) selectively heat treating an outer region of the tube by first heating the outer region to the alpha plus beta region while cooling an inner region of the tube and then rapidly quenching the outer region;

(g) performing a second pass cold work step followed by annealing; and (h) performing a third pass cold work step followed by annealing.

40. The method of claim 39 wherein the step of selectively heat treating heats the outer region of the tube to a temperature of about 927° C. and wherein the zirconium alloy includes at least about 98% zirconium and, in addition, one or more elements selected from the group consisting of iron, nickel, chromium, tin, and niobium.

41. The method of claim 40 wherein the annealing steps following the first and second cold work steps are conducted at a temperature of about 650° C. for between about two and four hours, and the annealing step following the third cold work step is conducted at about 577° C. for about two hours.

42. The method of claim 39 wherein the outer region of the tube comprises about the outer 15% of the tube.

43. The method of claim 39 wherein said selective heat treating of an outer region includes the steps of inductively heating said outer region while cooling said tube with a fluid.

44. A method of processing a zirconium alloy tube which has been subjected to a beta quench, said method comprising the steps of:

(a) performing one or more steps of heating said tube to at least about 621° C. for selected lengths of time, the number, time, and temperature of said steps of heating being selected such that the accumulated normalized annealing time is at least $10^{-17}$ hours, wherein said accumulated normalized annealing time is given by the following expression:

$$\Sigma \, (t_i \exp(-40,000/T_j))$$

where summation is taken over each of said steps after said beta quench, and where $t_i$ is the time in hours and $T_i$ is the temperature in Kelvin of a step; and, (b) selectively heating an outer region of the tube to at least the alpha plus beta region while cooling an inner region of the tube.

45. The method of claim 44 wherein the accumulated normalized annealing time is at least about $5 \times 10^{-17}$ hours.

46. The method of claim 44 wherein the step of selectively heating the outer region is conducted in an induction coil heater.

47. The method of claim 44 wherein the step of selectively heating the outer region of the tube heats about the outer 15% of the tube.

48. The method of claim 44 wherein the zirconium alloy includes at least about 98% zirconium and, in addition, one or more elements from the group consisting of iron, nickel, chromium, tin, and niobium.

* * * * *